May 20, 1930. H. KRAMER ET AL 1,759,512
EGG SEPARATOR
Filed Nov. 10, 1928
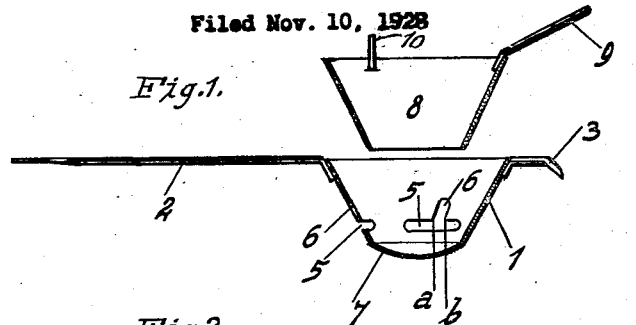
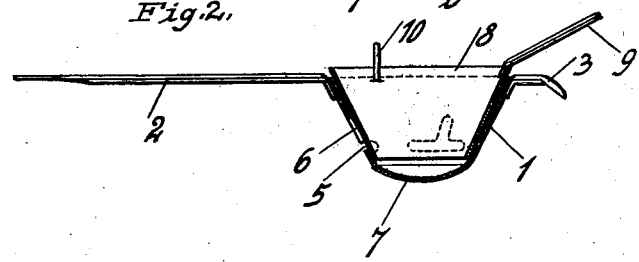
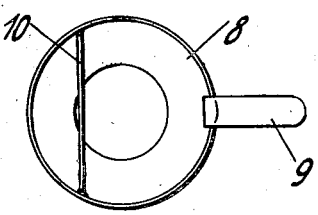
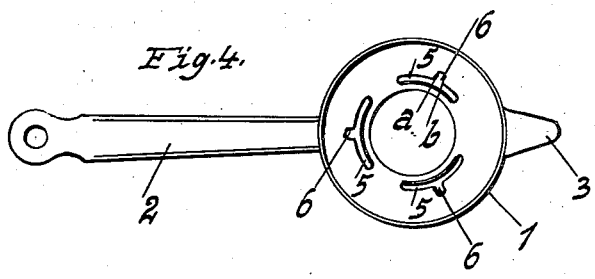
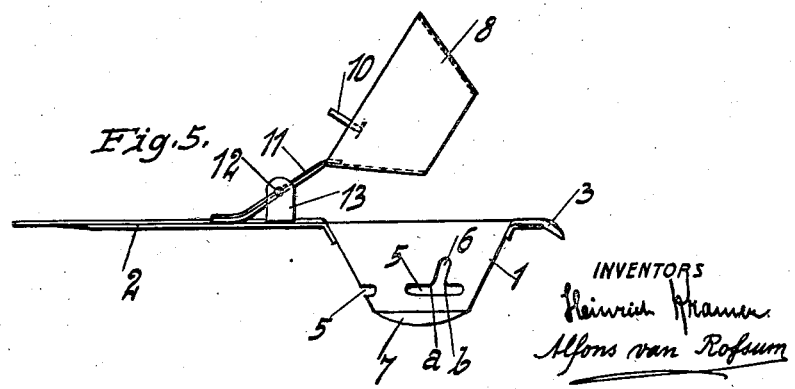
INVENTORS
Heinrich Kramer
Alfons van Rofsum Patented May 20, 1930

1,759,512

UNITED STATES PATENT OFFICE

HEINRICH KRAMER, OF FRANKFORT-ON-THE-MAIN-HEDDERHEIM, AND ALFONS VAN ROSSUM, OF FRANKFORT-ON-THE-MAIN-ESCHERSHEIM, GERMANY

EGG SEPARATOR

Application filed November 10, 1928, Serial No. 318,561, and in Germany March 18, 1927.

Our invention relates to a separator for raw eggs, and the essential features wherein the invention resides comprise a preferably conical container provided with discharge openings and a conical funnel engaging the said container and covering its discharge openings from the inside, the funnel being removed from the container to separate the white of the egg from the yolk after the egg has been found to be good.

Two forms of the invention are illustrated in the accompanying drawing, in which Figure 1 is a longitudinal section of the egg separator with the funnel removed therefrom; Fig. 2, a longitudinal section like Fig. 1 with the funnel inserted in the container; Fig. 3, a top view of the funnel; Fig. 4, a top view of the container; and Fig. 5, a side view of a modification with the funnel articulated to the handle of the container and swung out of the latter.

Referring to the drawing, 1 is a preferably conical container provided with a handle 2 to facilitate handling, and 3 is a nose, the handle 2 and the nose 3 serving for arranging the container 1 over the opening of a vessel. On its conical circumference the container 1 is provided with a plurality of discharge openings 5, 6 which preferably have a T-shaped cross section and serve for discharging the white of the egg from the container 1 after its separation from the egg yolk. The sharp corners a and b at the junctions of the approximately vertical and approximately horizontal portions of the discharge openings serve to pierce the thin skin which encloses the white of the egg. The funnel 8, which is fitted with the handle 9 and the ledge 10 for breaking the shell of the raw egg, engages the container 1 so that the discharge openings 5, 6 are covered and is then lifted out of the container in order to separate the white of the egg from the yolk.

In the modification shown in Fig. 5 the funnel 8 is provided with a breaking ledge 10 and a handle 11 which at 12 is articulated to the bearing 13 of the handle 2 of the container 1 so that the funnel 8, by slightly depressing the handle 11, can be swung out of the container 1, as indicated by Fig. 5.

The modification shown in Figs. 1 to 4 functions as follows: The shell of the raw egg is carefully broken by the ledge 10, whereupon both the white of the egg and the yolk drop into the container 1, the discharge openings 5, 6 of which have been previously covered by the funnel 8, as shown in Fig. 2. Both the white of the egg and the yolk float within the container 1, the yolk resting on the curved bottom 7. Should the egg be found to be bad, it can be thrown out of the container 1 covered by the funnel 8 without a separation having been effected. On the other hand, if the egg is good, the white of it is separated from the yolk by lifting the funnel 8 by means of its handle 9 out of the container 1, because the removal of the funnel 8 releases the openings 5, 6 for the discharge of the white of the egg while the yolk remains on the curved bottom 7 of the container 1. The egg yolk can be removed without any damage after the discharge openings 5, 6 have been covered again by the funnel 8.

In the modification shown in Fig. 5 the process of separation is the same as described above, with the difference, however, that the funnel 8 is not lifted out of the container 1 and then re-inserted but swung out of it by depressing its handle 11, which is articulated at 12 to the bearing 13 of the handle 2 of the container 1, and then swung back again into its initial position by releasing the handle 11.

We claim:—

1. Egg separator comprising a conical container having a number of discharge openings and a handled conical funnel engaging the said container and being adapted to be lifted therefrom.

2. Egg separator comprising a conical container having a number of discharge openings and a handled and articulated conical funnel engaging the said container and being adapted to be swung therefrom by a depression of its handle.

In testimony whereof we have affixed our signatures.

HEINRICH KRAMER.
ALFONS VAN ROSSUM.